(12) United States Patent
Neuteboom et al.

(10) Patent No.: US 10,047,218 B2
(45) Date of Patent: Aug. 14, 2018

(54) POLYOLEFIN COMPOSITION

(71) Applicants: SAUDI BASIC INDUSTRIES CORPORATION, Riyadh (SA); SABIC GLOBAL TECHNOLOGIES B.V., Bergen op Zoom (NL)

(72) Inventors: Peter Neuteboom, Hoensbroek (NL); Pieter Valkier, Sittard (NL)

(73) Assignees: SAUDI BASIC INDUSTRIES CORPORATION, Riyadh (SA); SABIC GLOBAL TECHNOLOGIES B.V., Bergen op Zoom (NL)

( * ) Notice: Subject to any disclaimer, the term of this patent is extended or adjusted under 35 U.S.C. 154(b) by 40 days.

(21) Appl. No.: 15/106,432

(22) PCT Filed: Dec. 10, 2014

(86) PCT No.: PCT/EP2014/077205
§ 371 (c)(1),
(2) Date: Jun. 20, 2016

(87) PCT Pub. No.: WO2015/091151
PCT Pub. Date: Jun. 25, 2015

(65) Prior Publication Data
US 2017/0002188 A1    Jan. 5, 2017

(30) Foreign Application Priority Data
Dec. 20, 2013    (EP) .................................. 13199158

(51) Int. Cl.
*C08L 23/14*    (2006.01)
*C08L 23/12*    (2006.01)
(Continued)

(52) U.S. Cl.
CPC .......... *C08L 23/14* (2013.01); *B29C 45/0001* (2013.01); *C08L 23/12* (2013.01);
(Continued)

(58) Field of Classification Search
CPC .......... C08L 23/12; C08L 23/14; C08L 23/16; C08L 23/0815; C08L 2205/025;
(Continued)

(56) References Cited

U.S. PATENT DOCUMENTS 4,399,054 A    8/1983    Ferraris et al.
4,414,132 A    11/1983    Goodall et al.
(Continued)

FOREIGN PATENT DOCUMENTS

EP    0019330 A1    11/1980
EP    0398698 A2    11/1990
(Continued)

OTHER PUBLICATIONS

Hirano et al., "Morphological Analysis of the Tiger Stripe on Injection Molding of Polypropylene/Ethylene-Propylene Rubber/Talc Blends Dependent on Based Polypropylene Design," J. Applied Polym. Sci. vol. 104, 192-199 (2007).
(Continued)

*Primary Examiner* — Satya Sastri
(74) *Attorney, Agent, or Firm* — Cantor Colburn LLP

(57) ABSTRACT

The present invention relates to a polyolefin composition comprising a first heterophasic propylene copolymer and a second heterophasic propylene copolymer, wherein the first heterophasic propylene copolymer comprises: from 70-90 wt % of a first polypropylene having a melt flow index of from 55-85 g/10 min as measured according to ISO 1133 (2.16 kg and 230° C.), from 10-30 wt % of a first ethylene α-olefin copolymer having a melt flow index of from 2.5-5.0 g/10 min in accordance with ISO 1133 (2.16 kg and 230° C.), the respective amounts of first polypropylene and first ethylene α-olefin copolymer being based on the weight of the first heterophasic propylene copolymer and wherein the second heterophasic propylene copolymer comprises: from
(Continued)

Figure 1:
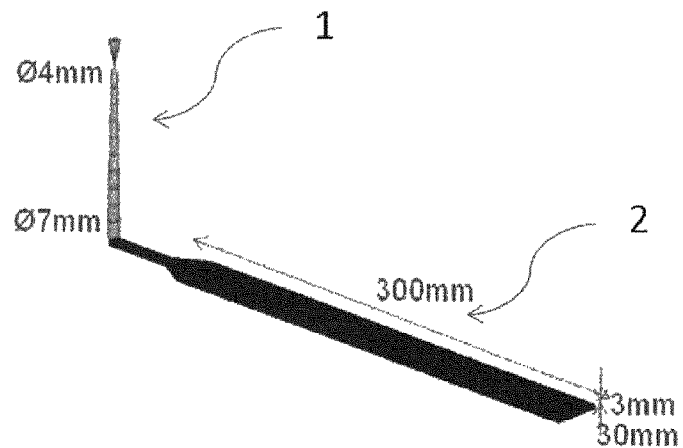

60-85 wt % of a second polypropylene having a melt flow index of from 50-100 g/10 min as measured according to ISO 1133 (2.16 kg, 230° C.), from 15-40 wt % of a second ethylene α-olefin copolymer having a melt flow index of from 0.050-0.30 g/10 min in accordance with ISO 1133 (2.16 kg and 230° C.), the respective amounts of second polypropylene and second ethylene α-olefin copolymer being based on the weight of the second heterophasic propylene copolymer, and wherein a weight ratio of said first and second heterophasic propylene copolymer is from 1 to 10. The invention further relates to automotive parts comprising said composition and having good tiger stripe performance.

18 Claims, 1 Drawing Sheet

(51) Int. Cl.
*B29C 45/00* (2006.01)
*B29K 23/00* (2006.01)
*B29L 31/30* (2006.01)

(52) U.S. Cl.
CPC ... *B29K 2023/10* (2013.01); *B29L 2031/3055* (2013.01); *C08L 2205/025* (2013.01); *C08L 2207/02* (2013.01); *C08L 2308/00* (2013.01); *C08L 2314/02* (2013.01)

(58) Field of Classification Search
CPC ............. C08L 2207/02; C08L 2308/00; C08L 2314/02; C08K 3/34; B29C 45/0001; B29K 2023/10; B29L 2031/3055
See application file for complete search history.

(56) References Cited

U.S. PATENT DOCUMENTS

| | | | |
|---|---|---|---|
| 4,472,524 A | 9/1984 | Albizzati | |
| 4,579,836 A | 4/1986 | Azoumanidis et al. | |
| 4,612,299 A | 9/1986 | Azroumanidis et al. | |
| 4,771,024 A | 9/1988 | Nestlerode et al. | |
| 4,866,022 A | 9/1989 | Arzoumanidis et al. | |
| 4,950,720 A | 8/1990 | Randall, Jr. et al. | |
| 4,978,648 A | 12/1990 | Barbe et al. | |
| 5,066,737 A | 11/1991 | Job | |
| 5,077,357 A | 12/1991 | Job | |
| 5,093,415 A | 3/1992 | Brady, III et al. | |
| 5,106,806 A | 4/1992 | Job | |
| 5,218,047 A | 6/1993 | Schwager et al. | |
| 5,556,820 A | 9/1996 | Funabashi et al. | |
| 5,567,665 A | 10/1996 | Wagner et al. | |
| 6,268,306 B1 | 7/2001 | Zakharov et al. | |
| 6,300,415 B1 | 10/2001 | Okayama et al. | |
| 6,384,142 B1 | 5/2002 | Burkhardt et al. | |
| 6,395,670 B1 | 5/2002 | Morini et al. | |
| 6,799,568 B2 | 10/2004 | Zakharov et al. | |
| 6,825,146 B2 | 11/2004 | Kilty et al. | |
| 7,947,788 B2 | 5/2011 | Ramjoie et al. | |
| 8,618,220 B2 | 12/2013 | Reijntjens et al. | |
| 2001/0012874 A1 | 8/2001 | Huffer et al. | |
| 2002/0035209 A1 | 3/2002 | Kanzaki et al. | |
| 2002/0040105 A1 | 4/2002 | Kanzaki et al. | |
| 2003/0195299 A1 | 10/2003 | Stevens et al. | |
| 2005/0261434 A1 | 11/2005 | Yaras et al. | |
| 2012/0157599 A1 | 6/2012 | Doufas et al. | |

FOREIGN PATENT DOCUMENTS

| | | | | |
|---|---|---|---|---|
| EP | 1273595 A1 | 1/2003 | | |
| EP | 1283222 A1 | 2/2003 | | |
| EP | 1336625 A1 | 8/2003 | | |
| EP | 1354901 A1 * | 10/2003 | ............. | C08L 10/06 |
| EP | 1647575 A1 | 4/2006 | | |
| EP | 1672021 A1 * | 6/2006 | ............. | C08L 23/10 |
| EP | 1781737 B1 | 5/2007 | | |
| EP | 2154194 A1 * | 2/2010 | ............. | C08L 23/12 |
| EP | 2495280 A1 | 9/2012 | | |
| WO | 9632426 A1 | 10/1996 | | |
| WO | 9632427 A1 | 10/1996 | | |
| WO | 9845338 A1 | 10/1998 | | |
| WO | 0123441 A1 | 4/2001 | | |
| WO | 0228958 A1 | 4/2002 | | |
| WO | 03051984 A1 | 6/2003 | | |
| WO | 03068828 A1 | 8/2003 | | |
| WO | 03106553 A1 | 12/2003 | | |
| WO | 2004087805 A1 | 10/2004 | | |
| WO | 2006010414 A1 | 2/2006 | | |
| WO | 2006056338 A1 | 6/2006 | | |
| WO | 2007134851 A1 | 11/2007 | | |
| WO | 2010108866 A1 | 9/2010 | | |
| WO | WO 2012117086 A1 * | 9/2012 | ............. | C08L 23/12 |
| WO | 2013079539 A1 | 6/2013 | | |

OTHER PUBLICATIONS

Hirano et al., "Morphological Analysis of Tiger-Stripe and Striped Pattern Deterioration on Injection Molding of Polypropylene/Rubber/Talc Blends," (Jan. 22, 2007) 2 Pages.
International Search Report for International Application No. PCT/EP2014/077205; International Filing Date: Dec. 10, 2014; dated Feb. 19, 2015; 4 Pages.
Maeda et al., "Flow Mark in the Injection Molding of Polypropylene/Rubber/Talc Blends," Journal of the Society of Rheology vol. 35, No. 5 (2007), pp. 293-299.
Maier, C. et al.: "Polypropylene—The Definitive User's Guide and Databook"; William Andrew Publishing/Plastics Design Library; Norwich NY; 1998; 2 Pages.
Patham et al, "Flow Marks in Injection Molding of Polypropylene and Ethylene-Propylene Elastomer Blends: Analysis of Morphology and Rheology,"Published Online in Wiley InterScience (www.interscience.wiley.com) Sep. 2004; 12 Pages.
Ser van der Ven "Polypropylene and Other Polyolefins: Polymerization and Characterization," Studies in Polymer Science, Elsevier (1990) 11 Pages.
Written Opinion of the International Searching Authority for International Application No. PCT/EP2014/077205; International Filing Date: Dec. 10, 2014; dated Feb. 19, 2015; 5 Pages.

* cited by examiner

POLYOLEFIN COMPOSITION

CROSS REFERENCE TO RELATED APPLICATIONS

This application is a 371 of International Application No. PCT/EP2014/077205, filed Dec. 10, 2014, which claims priority to European Application No. 13199158.0, filed Dec. 20, 2013, which are incorporated herein by reference in their entirety.

The present invention relates to a polyolefin composition comprising a first heterophasic polypropylene copolymer and second heterophasic polypropylene copolymer. The present invention further relates to a heterophasic propylene copolymer containing a relatively high viscosity rubber phase. The present invention further relates to a heterophasic propylene copolymer containing a relatively low viscosity rubber phase.

In the automotive industry polypropylene based materials are often used for their desirable combination of good mechanical properties and low cost. In particular so called impact propylene copolymers are often used in applications like bumper fascia and instrument panels. The requirements for automotive applications include low Coefficient of Linear Thermal Expansion (CLTE), good impact strength, good stiffness, scratch resistance and good optical surface properties. In order to obtain a low CLTE together with the desired mechanical properties the polypropylene based materials usually contain a certain amount of inorganic filler, such as in particular talc.

The addition of talc however is known to deteriorate the optical surface properties. In particular it increases the risk for so called "tiger stripes (TS)". Tiger stripes as used herein refers to color and gloss variations on the surface of an injection molded article, which occurs because of unstable mold filling properties of the molten polymer as it is being injected into the mold and formed into the desired shape. Usually these variations can be observed as alternating areas of low and high gloss and/or light or darker color, wherein the areas usually are substantially perpendicular to the flow direction of an injection moulded article. Tiger stripes may also be referred to as tiger marks or tiger (flow) marking.

Tiger stripes typically occur in polypropylene based materials containing polypropylene, a rubber dispersed in the polypropylene and an inorganic filler, in particular talc.

Examples of such appearance and a more scientific discussion on the cause of tiger stripes may be found in the publication of Hirano et al, Journal of Applied Polymer Science, Vol. 104, 192-199 (2007). A further publication titled "Morphological Analysis of Tiger-Stripe and Striped Pattern Deterioration on injection Moulding of Polypropylene/Rubber/Talc Blends" in name of K. Hirano, Y. Suetsugu, S. Tamura and T. Kanai, provides further background on the matter.

Solutions for reduction of tiger stripes have been proposed in the prior art.

WO02/28958, WO2004/087805 and WO2010/0108866 provide a solution that generally consist in the provision of a masterbatch which may be diluted with additional polyolefins so as to provide a compound having the desired tiger stripe performance and mechanical properties.

WO2013/079539 discloses a polyolefin composition comprising a. 35-90 wt %, based on the weight of the polyolefin composition, of a heterophasic polypropylene composition comprising i. 10-50 wt %, based on the weight of the heterophasic polypropylene composition, of a first polypropylene (PP1) having an $MFR_2$ measured according to ISO 1133 of from 30-80 g/10 min (230° C., 2.16 kg), ii. 20-65 wt %, based on the weight of the heterophasic polypropylene composition, of a second polypropylene (PP2) having an $MFR_2$ measured according to ISO 1133 of from 100-250 g/10 min (230° C., 2.16 kg), iii. 5-30 wt %, based on the weight of the heterophasic polypropylene composition of a first xylene cold soluble fraction (XS1) having an intrinsic viscosity $IV_{XS1}$ of 2.0-3.0 dl/g, iv. 5-25 wt %, based on the weight of the heterophasic polypropylene composition of a second xylene cold soluble (XS2) fraction having an intrinsic viscosity $IV_{XS2}$ of 1.5-2.8 d/g, with the proviso that $IV_{XS1} \neq IV_{XS2}$, b. 5-40 wt %, based on the weight of the polyolefin composition, of an inorganic filler, and c. 5-25 wt %, based on the weight of the polyolefin composition, of an ethylene/propylene elastomer.

US 2002/0035209 discloses a polypropylene resin composition containing two kinds of specified propylene-ethylene block copolymers having mutually different structures. More particularly, this reference discloses a polypropylene resin composition providing a molded article excellent in appearance when formed into a molded article because flow marks hardly generate, in other words, a die swell is high and few fish eyes generate. More in particular this reference discloses a polypropylene resin composition comprising:

95 to 80% by weight of a polypropylene resin (A) selected from the group consisting of a propylene-ethylene block copolymer (i) having a propylene homopolymer portion and propylene-ethylene random copolymer portion, and a mixture (ii) of the propylene-ethylene block copolymer (i) and a propylene homopolymer, wherein an intrinsic viscosity $[\eta]^A_{EP}$ of the propylene homopolymer portion when the resin (A) is the copolymer (i), or of the total of the propylene homopolymer portion and the propylene homopolymer when the resin (A) is the mixture (ii) is not more than 1.3 dl/g, and an intrinsic viscosity $[\eta]^A_{EP}$ of the propylene-ethylene random copolymer portion is not more than 3.0 dl/g; and 5 to 20% by weight of a propylene-ethylene block copolymer (B) composed of a propylene homopolymer portion and propylene-ethylene random copolymer portion wherein an intrinsic viscosity $[\eta]^B_{EP}$ of the propylene-ethylene random copolymer is 8.0 to 15 dl/g, and wherein the polypropylene resin composition has a melt flow rate (MFR) of from 5.0 to 150 g/10 min., and the sum of the (A) and (B) is 100% by weight.

EP 2495280 discloses a polyolefin composition comprising a. 35-90 wt %, based on the weight of the polyolefin composition, of a heterophasic polypropylene composition comprising i. 10-50 wt %, based on the weight of the heterophasic polypropylene composition, of a first propylene homopolymer (PPH1) having an MFR2 measured according to ISO 1133 of from 30-80 g/10 min (230° C., 2.16 kg), ii. 20 65 wt %, based on the weight of the heterophasic polypropylene composition, of a second propylene homopolymer (PPH2) having an MFR2 measured according to ISO 1133 of from 100-250 g/10 min (230° C., 2.16 kg), iii. 5 30 wt %, based on the weight of the heterophasic polypropylene composition of a first xylene cold soluble fraction (XS1) having an intrinsic viscosity IV$_{XS1}$ of 2.0-3.0 dl/g, iv. 5-25 wt %, based on the weight of the heterophasic polypropylene composition of a second xylene cold soluble (XS2) fraction having an intrinsic viscosity IV$_{XS2}$ of 1.5-2.8 dl/g, with the proviso that IV$_{XS1}$≠IV$_{XS2}$ b. 5 40 wt %, based on the weight of the polyolefin composition, of an inorganic filler, and c. 5-25 wt %, based on the weight of the polyolefin composition, of an ethylene/1-butene elastomer Tiger stripes are undesirable in automotive applications, in particular in case where the polypropylene based material is not provided with an additional layer such as paint or a laminating layer.

At the same time automotive applications differ in terms of mechanical and melt flow rate requirements, such that there is a need for material suppliers to have the opportunity to meet the combination of good tiger stripe performance, met flow rate and mechanical properties, in particular stiffness and impact properties, while at the same time keeping cost a reasonable level.

It is therefore an object of the present invention to provide a polyolefin composition that allows the manufacture of automotive parts having good tiger stripe performance while being able to meet a variety of mechanical and melt flow properties.

It is in particular an object of the present invention to provide a polyolefin composition including both an ethylene-propylene elastomer and an inorganic filler which, when moulded into a final part for automotive application, exhibits good tiger stripe performance.

It is a further object to provide a heterophasic propylene copolymer with a reduced problem of tiger stripes, which is suitable for impact resistant applications, like for example automotive parts such as bumper fascia's.

Yet a further object of the present invention is to provide a polyolefin composition that exhibits good tiger stripe performance as well as good scratch resistance.

To that extent the present invention provides a polyolefin composition comprising a first heterophasic propylene copolymer and a second heterophasic propylene copolymer, wherein the first heterophasic propylene copolymer comprises:
from 70-90 wt % of a first polypropylene having a melt flow index of from 55-85 g/10 min as measured according to ISO 1133 (2.16 kg and 230° C.),
from 10-30 wt % of a first ethylene α-olefin copolymer having a melt flow index of from 2.5-5.0 g/10 min in accordance with ISO 1133 (2.16 kg and 230° C.),
the respective amounts of first polypropylene and first ethylene α-olefin copolymer being based on the weight of the first heterophasic propylene copolymer,
and wherein the second heterophasic propylene copolymer comprises:
from 60-85 wt % of a second polypropylene having a melt flow index of from 50-100 g/10 min as measured according to ISO 1133 (2.16 kg, 230° C.),
from 15-40 wt % of a second ethylene α-olefin copolymer having a melt flow index of from 0.050-0.30 g/10 min in accordance with ISO 1133 (2.16 kg and 230° C.),
the respective amounts of second polypropylene and second ethylene α-olefin copolymer being based on the weight of the second heterophasic propylene copolymer,
wherein preferably a weight ratio of said first and second heterophasic propylene copolymer is from 1 to 10.

In a preferred embodiment the present invention provides a polyolefin composition comprising a first heterophasic propylene copolymer and a second heterophasic propylene copolymer, wherein the first heterophasic propylene copolymer comprises:
from 70-90 wt % of a first polypropylene having a melt flow index of from 55-85 g/10 min as measured according to ISO 1133 (2.16 kg and 230° C.),
from 10-30 wt % of a first ethylene α-olefin copolymer having a melt flow index of from 2.5-4.0 g/10 min in accordance with ISO 1133 (2.16 kg and 230° C.), the respective amounts of first polypropylene and first ethylene α-olefin copolymer being based on the weight of the first heterophasic propylene copolymer,
and wherein the second heterophasic propylene copolymer comprises:
from 60-85 wt % of a second polypropylene having a melt flow index of from 50-80 g/10 min as measured according to ISO 1133 (2.16 kg, 230° C.),
from 15-40 wt % of a second ethylene α-olefin copolymer having a melt flow index of from 0.050-0.30 g/10 min in accordance with ISO 1133 (2.16 kg and 230° C.),
the respective amounts of second polypropylene and second ethylene α-olefin copolymer being based on the weight of the second heterophasic propylene copolymer,
wherein preferably a weight ratio of said first and second heterophasic propylene copolymer is from 1 to 10.

The present inventors found that the application of two grades of heterophasic propylene composition each having distinct and different characteristics allows mechanical and melt flow properties to be set at a desired level while at the same time maintaining good tiger stripe performance.

Therefore by application of the present inventors at least part of the aforementioned objectives are met.

The term heterophasic propylene copolymer is known in the art. A heterophasic propylene copolymer basically has at least a two-phase structure, consisting of a propylene-based (semi-crystalline) matrix and a dispersed rubber phase, typically an ethylene-α-olefin rubber, such as an ethylene-propylene rubber (EPR). These heterophasic polypropylenes are generally prepared in a series of reactors, by polymerization of propylene in the presence of a catalyst system, and subsequent polymerization of a propylene-α-olefin mixture. However they may also be made by blending different (co)polymers. The advantage of heterophasic polypropylene is improved impact resistance, especially at lower temperatures.

Higher amounts of disperse phase generally result in improved impact properties. However, at the same time stiffness and tiger stripe performance may deteriorate. Hence, the ratio of matrix and disperse phase in a heterophasic polypropylene can be used as a tool to tune the balance between stiffness and impact strength.

First Heterophasic Propylene Copolymer.

The first heterophasic propylene copolymer comprises a first polypropylene having a melt flow index of from 55-85 g/10 min as measured according to ISO 1133 (2.16 kg; 230° C.). In addition to that it comprises a first ethylene α-olefin copolymer having a relatively high melt flow index of from 2.5-5.0 g/10 min, preferably from 2.5-4.0 g/10 min, preferably from 3.0 to 4.0 g/10 min, in accordance with ISO 1133 (2.16 kg; 230° C.). As a consequence of its composition the first heterophasic propylene copolymer allows a combination of good impact properties as well as relatively high melt flow index.

The melt flow index of the ethylene α-olefin copolymer is said to be "in accordance with ISO1133" for the reason that this melt flow index was calculated rather than actually measured. The calculation was carried out as follows:

$$\text{Log}(\text{MFI}_{copol}) = X_{matrix} * \text{Log}(\text{MFI}_{matrix}) + X_{disperse} * \text{Log}(\text{MFI}_{disperse})$$

Wherein:
$\text{MFI}_{copol}$=Melt flow index of the heterophasic propylene copolymer
$\text{MFI}_{matrix}$=Melt flow index of the matrix phase, i.e. the first polypropylene
$\text{MFI}_{disperse}$=Melt flow index of the disperse to be calculated
$X_{matrix}$ and $X_{disperse}$ represent the weight fractions of the matrix and disperse phase respectively.

The amount of first polypropylene is preferably from 75-85 wt %.

The amount of first ethylene α-olefin copolymer is preferably from 15-25 wt %.

The first polypropylene is a propylene homopolymer or a propylene α-olefin copolymer having a propylene content of at least 97 wt %, based on the weight of the first polypropylene.

The first ethylene α-olefin copolymer is preferably an ethylene propylene copolymer having an ethylene content of from 40-65 wt %, preferably 40-60 wt %, more preferably from 50-58 wt %, based on the weight of the ethylene propylene copolymer.

The first heterophasic propylene copolymer is preferably a reactor grade copolymer. The first heterophasic propylene copolymer is preferably a non-shifted, or non-visbroken copolymer. The term non-visbroken is known in the art, yet for the avoidance of doubt it means that the materials was not treated such as to modify the molecular weight and/or the molecular weight distribution of the polymer directly after polymerisation. In other words, non-visbroken polymers are not treated with peroxides, radiation, or any other initiating source for chain breaking reactions to occur. An advantage of non-visbroken polypropylenes over vis-broken polypropylenes is that the former generally suffer less from the release of low molecular weight materials, such materials inherently being produced upon visbreaking. For the avoidance of doubt, the term reactor grade implies that the copolymer is non-visbroken (or non-shifted).

For the purpose of the present invention the combined amount of first polypropylene and first ethylene α-olefin copolymer in the first heterophasic propylene copolymer is substantially 100 wt % based on the weight of the first heterophasic propylene copolymer. Next to the first polypropylene and first ethylene α-olefin copolymer no other materials are comprised in the first heterophasic propylene copolymer except for an optional small amount of stabilisers and/or additives common in the art.

The aforementioned preferred features may be combined in any manner and any combination is considered to be disclosed herein.

Although it is preferred that the first heterophasic propylene copolymer is comprised of a single material, i.e. a single grade, a combination of more than one first heterophasic propylene copolymers may also be envisaged and should be considered as falling in the scope of the present invention.

Second Heterophasic Propylene Copolymer.

The second heterophasic propylene copolymer comprises a second polypropylene having a melt flow index of from 50-100 g/10 min as measured according to ISO 1133 (2.16 kg; 230° C.). In addition to that it contains a second ethylene α-olefin copolymer having a relatively low melt flow index of from 0.05-0.30 g/10 min in accordance with ISO 1133 (2.16 kg; 230° C.). As a consequence of its composition the second heterophasic propylene, when used in combination of the first heterophasic propylene copolymer allows impact properties to be tuned at the desired level.

The melt flow index of the ethylene α-olefin copolymer is said to be "in accordance with ISO1133" for the reason that this melt flow index was calculated rather than actually measured. The calculation was carried out as follows:

$$\text{Log}(\text{MFI}_{copol}) = X_{matrix} * \text{Log}(\text{MFI}_{matrix}) + X_{disperse} * \text{Log}(\text{MFI}_{disperse})$$

Wherein:
$\text{MFI}_{copol}$=Melt flow index of the heterophasic propylene copolymer
$\text{MFI}_{matrix}$=Melt flow index of the matrix phase, i.e. the second polypropylene
$\text{MFI}_{disperse}$=Melt flow index of the disperse to be calculated
$X_{matrix}$ and $X_{disperse}$ represent the weight fractions of the matrix and disperse phase respectively.

The amount of second polypropylene is preferably from 65-80 wt %.

The amount of second ethylene α-olefin copolymer is preferably from 20-35 wt %, more preferably 25-35 wt %, more preferably from 30-35 wt %.

The second polypropylene is a propylene homopolymer or a propylene α-olefin copolymer having a propylene content of at least 97 wt %, based on the weight of the first polypropylene.

The second ethylene α-olefin copolymer is preferably an ethylene propylene copolymer having an ethylene content of from 30-65 wt %, preferably from 30-50 wt %, more preferably from 35-40 wt %, based on the weight of the ethylene propylene copolymer. The present inventors have found that a lower ethylene content, i.e. a higher propylene content, allows the rubber particles to be more finely dispersed in the second polypropylene forming the matrix. This has the effect that impact properties are maintained at an adequate level while an increased stiffness is obtained. Said in another way, the present inventors have found that such a lower ethylene content (or higher propylene content) provides a heterophasic propylene copolymer having an improved balance of impact and stiffness.

The second heterophasic propylene copolymer is preferably a reactor grade copolymer.

The second heterophasic propylene copolymer is preferably a non-shifted, or non-visbroken copolymer.

For the purpose of the present invention the combined amount of second polypropylene and second ethylene α-olefin copolymer in the second heterophasic propylene copolymer is substantially 100 wt % based on the weight of the second heterophasic propylene copolymer. Next to the second polypropylene and second ethylene α-olefin copolymer no other materials are comprised in the second heterophasic propylene copolymer except for an optional small amount of stabilisers and/or additives common in the art.

In accordance with the present invention the melt flow index of the first polypropylene and the second polypropylene may be the same or different.

Any or all of the aforementioned preferred features may be combined in any manner and any combination is considered to be disclosed herein.

Although it is preferred that the second heterophasic propylene copolymer is comprised of a single material, i.e. a single grade, a combination of more than one second heterophasic propylene copolymers may also be envisaged and should be considered as falling in the scope of the present invention.

The first and second heterophasic copolymer may be manufactured by methods known in the art. Such methods generally involve the use of two or more polymerisation reactors placed in series, wherein in a first reactor the matrix phase comprised of the first polypropylene or the second polypropylene (as the case may be) is produced. Once the polymerisation in the first reactor is completed the resulting polymer powder is transferred to a second reactor in which the first ethylene α-olefin copolymer or the second ethylene α-olefin copolymer (as the case may be) is produced. It is preferred that polymerisation is carried out using a Ziegler Natta type of catalyst. Ziegler Natta catalyst systems are known in the art and comprise a catalyst component, a co-catalyst component and an external donor. The catalyst component of the capitalist system primarily contains magnesium, titanium, halogen and an internal donor. Electron donors control the stereo specific properties and/or improve the activity of the catalyst system. A number of electron donors including ethers, esters, polysilanes, polysiloxanes, and alkoxysilanes are known in the art. In a preferred embodiment the heterophasic propylene compositions are manufactured using a two-stage polymerisation catalysed by the SHAC 320 catalyst, as available from Grace company.

Polyolefin Composition and Compound the polyolefin composition according to the present invention is a heterophasic polyolefin composition, comprising a continuous phase and a discontinuous phase. For the avoidance of doubt it is noted that the first polypropylene of the first heterophasic propylene copolymer and the second polypropylene of the second heterophasic propylene copolymer, although miscible, are different. That is to say, the first polypropylene and the second polypropylene together may form the continuous phase.

The discontinuous phase (or disperse phase) of the polyolefin composition of the present invention comprises the first ethylene α-olefin copolymer and the second of α-olefin copolymer. Although said copolymers may be miscible to some (low) extent they will be present as separately dispersed phases in the final product made from the polyolefin composition.

In a preferred embodiment of the polyolefin composition the first heterophasic propylene copolymer as well as the second heterophasic propylene copolymer are reactor grade copolymers.

In a preferred embodiment the first and second ethylene-α-olefin copolymers are ethylene-propylene copolymers. In such preferred embodiment it is further preferred that:
    the first ethylene propylene copolymer has an ethylene content of from 40-65 wt %, more preferably 40-60 wt %, even more preferably from 50-58 wt % based on the weight of the first ethylene propylene copolymer, and/or
    the second ethylene propylene copolymer has an ethylene content of from 30-65 wt %, preferably from 30-50 wt %, more preferably from 35-40 wt % based on the weight of the second ethylene propylene copolymer.

The present inventors have found that the ethylene content of the second ethylene α-olefin copolymer is of importance for good mechanical properties. In particular they found that a an ethylene-propylene copolymer having relatively low ethylene content (or high propylene content) results in significantly improved mechanical properties such as impact strength and stiffness, while at the same time having no adverse effect of tiger stripe performance. Further to that the shrinkage properties, in particular the CLTE (Coefficient of Linear Thermal Expansion) was found to improve upon higher propylene content.

The present invention further relates to a compound comprising the polyolefin composition as defined herein.

The compound according to the present invention preferably contains from 1-30, preferably 1-25 wt %, more preferably from 5-20 wt %, even more preferably from 5-15 wt % of an inorganic filler such as talc, based on the weight of the compound.

The compound according to the present invention may further comprise from 1-25 wt %, based on the weight of the compound, of an ethylene α-olefin copolymer elastomer. Such ethylene α-olefin copolymer elastomer is preferably selected from one or more of ethylene-butene copolymer elastomer, ethylene-hexene copolymer elastomer and ethylene-octene copolymer elastomer. Even more preferably the ethylene α-olefin copolymer elastomer is selected from one or more of an metallocene ethylene octene copolymer elastomer and a metallocene ethylene butene copolymer elastomer. Typically these elastomers are added to further improve the impact resistance. The density of such elastomers may be from 860-885 kg/m$^3$. The melt flow index for the elastomer may be from 0.10-10 g/10 min (ISO1133, 2.16 kg, 230° C.). Preferably the compound according to the present invention comprises from 5-20 wt %, or 7-18 wt %, or 10-15 wt % of elastomer.

The compound of the present invention preferably has an average tiger stripe rating, as defined herein below of at least 6.0, preferably at least 6.5.

The compound according to the present invention has a melt flow index of from 1-50 g/10 min, preferably from 2-35 g/10 min, more preferably from 5-20 g/10 min (ISO 1133, 2.16 kg, 230° C.).

The compound according to the present invention may be used for the manufacture of automotive parts, in particular exterior automotive parts.

The compound according to the present invention can be manufactured by melt blending the individual components according to any conventional procedure known in the art. Melt mixing devices suited for a this process are discontinuous and continuous kneader, twin screw extruders and single screw extruders with special mixing sections and co-kneaders.

Further Aspects of the Invention

In a further aspect the invention relates to the use of the compound as herein defined in an injection moulding process for reducing tiger stripes.

In a further aspect the invention relates to heterophasic propylene copolymer comprising:
    from 70-90 wt % of a first polypropylene having a melt flow index of from 55-85 g/10 min as measured according to ISO 1133 (2.16 kg and 230° C.), wherein the first polypropylene is a propylene homopolymer or a propylene α-olefin copolymer containing at least 97 wt % propylene, based on the weight of the first second polypropylene
    from 10-30 wt % of a first ethylene α-olefin copolymer having a melt flow index of from 2.5-5.0 g/10 min in accordance with ISO 1133 (2.16 kg and 230° C.), wherein the first ethylene α-olefin copolymer is an ethylene propylene copolymer having an ethylene content of from 40-60 wt %, preferably from 50-58 wt %, based on the weight of the ethylene propylene copolymer.

the respective amounts of first polypropylene and first ethylene α-olefin copolymer being based on the weight of the first heterophasic propylene copolymer, and wherein preferably the heterophasic propylene copolymer is a reactor grade propylene copolymer.

Preferred embodiments of this heterophasic propylene copolymer apply as herein defined for the first heterophasic propylene copolymer of the polyolefin composition according to the invention.

In a further aspect the invention relates to heterophasic propylene copolymer comprising:

from 70-90 wt % of a first polypropylene having a melt flow index of from 55-85 g/10 min as measured according to ISO 1133 (2.16 kg and 230° C.), wherein the first polypropylene is a propylene homopolymer or a propylene α-olefin copolymer containing at least 97 wt % propylene, based on the weight of the first second polypropylene from 10-30 wt % of a first ethylene α-olefin copolymer having a melt flow index of from 2.5-4.0 g/10 min in accordance with ISO 1133 (2.16 kg and 230° C.), wherein the first ethylene α-olefin copolymer is an ethylene propylene copolymer having an ethylene content of from 40-60 wt %, preferably from 50-58 wt %, based on the weight of the ethylene propylene copolymer.

the respective amounts of first polypropylene and first ethylene α-olefin copolymer being based on the weight of the first heterophasic propylene copolymer, and wherein preferably the heterophasic propylene copolymer is a reactor grade propylene copolymer.

Preferred embodiments of this heterophasic propylene copolymer apply as herein defined for the second heterophasic propylene copolymer of the polyolefin composition according to the invention.

In yet a further aspect, the invention relates to a heterophasic propylene copolymer comprising:

from 60-85 wt % of a second polypropylene having a melt flow index of from 50-100 g/10 min as measured according to ISO 1133 (2.16 kg and 230° C.), wherein the second polypropylene is a propylene homopolymer or a propylene α-olefin copolymer containing at least 97 wt % propylene, based on the weight of the second polypropylene from 15-40 wt % of a second ethylene α-olefin copolymer having a melt flow index of from 0.050-0.30 g/10 min in accordance with ISO 1133 (2.16 kg and 230° C.), wherein the second ethylene α-olefin copolymer is an ethylene propylene copolymer having an ethylene content of from 30-65 wt %, preferably from 30-50 wt %, more preferably from 35-40 wt % based on the weight of the ethylene propylene copolymer, the respective amounts of first polypropylene and first ethylene α-olefin copolymer being based on the weight of the first heterophasic propylene copolymer, and wherein preferably the heterophasic propylene copolymer is a reactor grade propylene copolymer.

Preferred embodiments of this heterophasic propylene copolymer apply as herein defined for the second heterophasic propylene copolymer of the polyolefin composition according to the invention.

In yet a further aspect, the invention relates to a heterophasic propylene copolymer comprising:

from 60-85 wt % of a second polypropylene having a melt flow index of from 50-80 g/10 min as measured according to ISO 1133 (2.16 kg and 230° C.), wherein the second polypropylene is a propylene homopolymer or a propylene α-olefin copolymer containing at least 97 wt % propylene, based on the weight of the second polypropylene from 15-40 wt % of a second ethylene α-olefin copolymer having a melt flow index of from 0.050-0.30 g/10 min in accordance with ISO 1133 (2.16 kg and 230° C.), wherein the second ethylene α-olefin copolymer is an ethylene propylene copolymer having an ethylene content of from 30-65 wt %, preferably from 30-50 wt %, more preferably from 35-40 wt % based on the weight of the ethylene propylene copolymer, the respective amounts of first polypropylene and first ethylene α-olefin copolymer being based on the weight of the first heterophasic propylene copolymer, and wherein preferably the heterophasic propylene copolymer is a reactor grade propylene copolymer.

Preferred embodiments of this heterophasic propylene copolymer apply as herein defined for the second heterophasic propylene copolymer of the polyolefin composition according to the invention.

In yet a further aspect the present invention relates to the use of a combination of the two aforementioned heterophasic propylene copolymers in a compound further containing an inorganic filler such as talc and an ethylene α-olefin copolymer elastomer and in amounts effective so as to enable the manufacture of moulded automotive parts having an average tiger stripe rating, as defined in the specification, of at least 6.

Rheological Behaviour

The present inventors have found that rheological behaviour of a heterophasic polyolefin composition can be used as an indication on sensitivity towards tiger stripes.

To that extent the present inventors have measured rheological behaviour using an Advanced Rheometrics Expansion System (ARES) from TA Instruments with two 25 mm diameter parallel plates, operating at 200° C. and applying a frequency sweep of from 100 to 0.1 rad per second.

Next the first derivate of the imaginary viscosity (eta") was plotted (on vertical, i.e. Y, axis) versus the actual viscosity (eta') on the horizontal, i.e. X, axis so as to form a "viscosity curve".

Based on the experiments performed by the inventors it was found that a regime can be defined wherein tiger stripe performance is good.

More in particular the present inventors found that if a viscosity curve of a heterophasic polyolefin composition lies above the curve represented by formula:

$$Y=-5.55556e-4*X+0.61111$$

(Y and X representing eta" and eta' respectively)

Tiger striper performance is good.

Likewise if a viscosity curve of a heterophasic polyolefin composition lies below the curve represented by formula:

$$Y=-0.00142*X+0.63333$$

Tiger striper performance is good.

In the area between these two curves tiger stripe performance usually is poor.

As such, the present invention relates to polyolefin compositions comprising a first and second propylene copolymer as herein defined, wherein the amounts of first and second heterophasic propylene copolymer is selected such that viscosity curve of the combination does not lie in the area between the two curves as defined above.

Measurement Methods

| | |
|---|---|
| Melt flow Index: (MFI) | Unless explicitly stated otherwise herein, the melt flow index was measured according to ISO 1133 (2.16 kg, 230° C.). |
| Impact Strength | The impact strength was determined by measuring the Izod impact strength at −20° C., 0° C. and 23° C. according to ISO 180 1A/∥ |
| Flexural modulus | The flexural modulus was determined according to ISO 178 at 23° C. in parallel orientation. |
| Tensile properties | Tensile properties were determined in accordance with ISO527/1A/T23II |
| Scratch resistance | Scratch resistance was performed using the Erichsen test, K59 texture. The VW scratch resistance test was measured according to the PV 3952 2002 scratch method of Volkswagen AG company on an Erichsen scratching device, with a load of 10N. The resulting value dL is a measure for the scratch resistance, a low dL value corresponding to high scratch resistance; this means that the scratch does not turn white but keeps the original colour of the scratched plaque. To fulfill this test requirement, dL should be lower than 1.5. |
| Intrinsic viscosity | Intrinsic viscosity of the propylene polymer and of the α-olefin elastomer were determined from the measured amounts of xylene soluble matter and xylene insoluble matter according to ISO-1628-1 and -3. |
| Xylene (in)solubles | Amount of the xylene-soluble matter (CXS) was determined according to ISO 16152:2005, which specifies a method for determining the mass fraction of a sample which is soluble in xylene at 25° C. CXS represents the content of the ethylene-α-olefin elastomer in the heterophasic propylene copolymer. The fraction insoluble in xylene at 25° C. (CXI) fraction of the composition was determined as the difference of 100 minus the percentage CXS. CXI represents the content of the propylene polymer in the heterophasic propylene copolymer. |

Tiger Stripe/Flow Marks Performance

Figure 2:
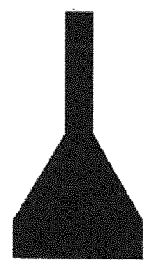
Figure 3:
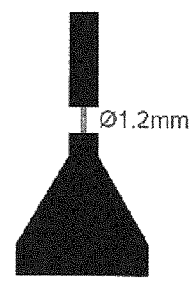

Samples of polyolefin composition was injection moulded into two types of ruler-shaped test specimens using the feeding system and the mould as illustrated in FIG. 1. The details of the two types of the moulds are illustrated in FIGS. 2 and 3. The two types of the moulds are called a fan gate (FIG. 2) and a pin-point gate (FIG. 3).

FIG. 1 illustrates the feeding system and the mold. The molten polyolefin composition is extruded through a nozzle 1 having an upper end having a diameter of 4 mm and a lower end having a diameter of 7 mm. The lower end of nozzle 1 merges with a rectangular channel of the mold.

FIG. 2 illustrates a "fan-gate" mould. Along the length of the mould, the width changes from about 6.5 mm to 30 mm and the thickness changes from about 3 mm to 2 mm. After the fan shaped part, an elongated part follows having a width of 30 mm and a thickness of 3 mm. The rectangular part is about 43 mm in length. The fan shaped part of the mould is about 25 mm in length.

FIG. 3 illustrates a "pin-gate" mould. The pin-point gate is identical to the fan gate of FIG. 2 except that the rectangular part comprises a portion having a width of 1.2 mm over a length of about 6 mm The melt temperature during the injection moulding is set at 240° C. and the mold is kept at room temperature. Three different screw speeds are used according to the following conditions.

Injection Conditions

| Condition | Screw speed injection [mm/sec] | Flow rate [cm³/sec] | Injection time [sec] |
|---|---|---|---|
| Low speed | 20 | 14.1 | 2.49-2.51 |
| Medium speed | 50 | 35.3 | 0.99-1.0 |
| High speed | 160 | 113.1 | 0.38-0.39 |

Specimens having a smooth side and a textured side were manufactured.

After moulding each of the specimens is visually observed for occurrence of tiger stripes on its smooth side and on its textured side. The quality of the surface was evaluated on a scale of 1 to 10, 10 being the best performance.

| TS score | description |
|---|---|
| 1 | *very sharp transitions between glossy and dull sections visible seen from any angle |
| 2 | *sharp transitions between glossy and dull sections seen from any angle |
| 3 | very visible transitions between glossy and dull sections seen from any angle |
| 4 | visible transitions between glossy and dull sections seen from any angle |
| 5 | less visible transitions between glossy and dull sections seen from any angle |
| 6 | visible transitions between glossy and dull sections seen from a specific angle only |
| 7 | less visible transitions between glossy and dull sections seen from a specific angle only |
| 8 | no transitions between glossy and dull sections visible and surface appearance inhomogeneous |
| 9 | no transitions between glossy and dull sections visible and surface appearance homogeneous |
| 10 | no transitions between glossy and dull sections visible and surface is perfect |

The average tiger stripe rating is defined as the numerical average of the individual tiger stripe ratings for each of the test specimens manufactured at low, medium and high speed, manufactured with the pin-gate and the fan-gate and measured on the smooth and on the textured surface. Hence, the average tiger stripe rating as defined herein is the average of 12 individual tiger stripe measurements.

EXPERIMENTS

A total of 38 experiments were carried out, numbered as E1-E38 in the tables 1-7 below.

In the experiments the following materials were used:

All of the heterophasic copolymers are reactor grade materials, i.e. are non-shifted or non-visbroken grades.

| | |
|---|---|
| PP612MK10 | Impact propylene copolymer commercially available from SABIC having a MFI of 33 g/10 min, a $C_2/C_3$ rubber content of about 18 wt % and a $C_2$ content of the rubber phase of about 54 wt %. |
| PP513MNK10 | Impact propylene copolymer commercially available from SABIC having a MFI of 70 g/10 min, a $C_2/C_3$ rubber content of about 18 wt % and a $C_2$ content of the rubber phase of about 54 wt %. |
| BG A0 | Heterophasic propylene copolymer having of a propylene homopolymer matrix phase and a $C_2/C_3$ copolymer disperse phase and having: |

|  |  |
|---|---|
|  | Rubber content ($C_2/C_3$ copolymer) 20 wt % |
|  | MFI_matrix 70 g/10 min |
|  | MFI_disperse 3.5 g/10 min |
|  | $C_2$ content in rubber 55 wt % |
|  | Overall MFI 38 g/10 min |
| BG A1 | Heterophasic propylene copolymer having of a propylene homopolymer matrix phase and a $C_2/C_3$ copolymer disperse phase and having: |
|  | Rubber content ($C_2/C_3$ copolymer) 20 wt % |
|  | MFI_matrix 75.0 g/10 min |
|  | MFI_disperse 3.0 g/10 min |
|  | $C_2$ content in rubber 40 wt % |
|  | Overall MFI 39 g/10 min |
| BG A2 | Heterophasic propylene copolymer having of a propylene homopolymer matrix phase and a $C_2/C_3$ copolymer disperse phase and having: |
|  | Rubber content ($C_2/C_3$ copolymer) 20 wt % |
|  | MFI_matrix 75.0 g/10 min |
|  | MFI_disperse 3.0 g/10 min |
|  | $C_2$ content in rubber 55 wt % |
|  | Overall MFI 40 g/10 min |
| BG B0 | Heterophasic propylene copolymer having of a propylene homopolymer matrix phase and a $C_2/C_3$ copolymer disperse phase and having: |
|  | Rubber content ($C_2/C_3$ copolymer) 30 wt % |
|  | MFI_matrix 70 g/10 min |
|  | MFI_disperse 0.2 g/10 min |
|  | $C_2$ content in rubber 58 wt % |
|  | Overall MFI 12 g/10 min |
| BG B1 | Heterophasic propylene copolymer having of a propylene homopolymer matrix phase and a $C_2/C_3$ copolymer disperse phase and having: |
|  | Rubber content ($C_2/C_3$ copolymer) 30 wt % |
|  | MFI_matrix 75.0 g/10 min |
|  | MFI_disperse 0.20 g/10 min |
|  | $C_2$ content in rubber 60 wt % |
|  | Overall MFI 12 g/10 min |
| BG B2 | Heterophasic propylene copolymer having of a propylene homopolymer matrix phase and a $C_2/C_3$ copolymer disperse phase and having: |
|  | Rubber content ($C_2/C_3$ copolymer) 30 wt % |
|  | MFI_matrix 75.0 g/10 min |
|  | MFI_disperse 0.15 g/10 min |
|  | $C_2$ content in rubber 35 wt % |
|  | Overall MFI 12 g/10 min |
| Talc_1 | Steamic OOSD, commercially available from Imersys Talc. |
| Talc_2 | HTP Ultra 5c, commercially available from Imifabi Talc |
| Talc_3 | Luzenac HAR T84, commercially available from Imersys Talc |
| Talc_4 | HTP 05, commercially available from Imifabi Talc |
| Engage 8200 | Polyolefin elastomer commercially available from Dow, having a density of 0.870 g/cm$^3$ and a MFI of 5 g/10 min (ASTM D1238, 2.16 kg, 230° C.) |
| Engage XLT8677 | Polyolefin elastomer commercially available from Dow, having a density of 0.870 g/cm$^3$ and a MFI of 0.5 g/10 min (ASTM D1238, 2.16 kg, 230° C.) |
| Tafmer DF740 | Ethylene based elastomer, commercially available from Mitsui Chemicals, having a density of 0.870 g/cm$^3$ and a MFI of 6.7 g/10 min (ASTM D1238, 2.16 kg, 230° C.) |
| Tafmer DF605 | Ethylene based elastomer, commercially available from Mitsui Chemicals, having a density of 0.861 g/cm$^3$ and a MFI of 0.9 g/10 min (ASTM D1238, 2.16 kg, 230° C.) |
| Other | Usual additives for compounds, like stabilisers, antioxidants and the like. |

Examples E1-E6 provide a comparison between the heterophasic propylene copolymers when used as a single heterophasic propylene copolymer in a compound further containing talc and ethylene α-olefin elastomer (Engage 8200).

Examples E7 to E14 show compositions according to the invention based on a combination of the first and second heterophasic copolymers as defined herein. It is noted that compositions based on BG B2 shows good results in terms of not only tiger stripe performance, but also in terms of impact at a more or less similar stiffness level (flexural modulus being indicative for the stiffness)

Table 3 shows the individual tiger stripe measurements for the examples E1-E14.

Examples E15-E20 provide a further comparison between the heterophasic propylene copolymers when used as a single heterophasic propylene copolymer in a compound further containing talc and ethylene α-olefin elastomer (Engage 8200).

Examples E21 to E24 show compositions according to the invention based on a combination of the first and second heterophasic copolymers as defined herein. It is noted that compositions based on BG B2 shows good results in terms of not only tiger stripe performance, but also in terms of impact at a more or less similar stiffness level (flexural modulus being indicative for the stiffness)

Examples E25-E27 show the results of a variation in the type of ethylene α-olefin copolymer elastomer. Tiger stripe performance is not affected to a large extent.

Examples E28 and E29 show the effect of talc type. The type of talc mainly appears to affect stiffness, but no significant effect on tiger stripe performance was observed.

Table 6 shows the individual tiger stripe measurements for the examples E15-E29.

Examples E30-E38 further contain compositions according to the invention. From Table 7 it can be observed that the inventive polyolefin compositions not only have good tiger stripe performance, but also show good flow (melt flow index), acceptable stiffness and impact properties, but in particular good scratch resistance values.

\* \* \*

TABLE 3

| | low speed | | medium speed | | high speed | | |
|---|---|---|---|---|---|---|---|
| | smooth | texture | smooth | texture | smooth | texture | |
| | — • | — • | — • | — • | — • | — • | Average |
| E1 | 7 7 | 8 7 | 6 5 | 6 5 | 5 5 | 6 5 | 6.0 |
| E2 | 8 8 | 8 8 | 8 8 | 8 7 | 6 6 | 6 6 | 7.3 |
| E3 | 9 7 | 6 5 | 7 7 | 5 5 | 7 7 | 6 5 | 6.3 |
| E4 | 8 8 | 8 8 | 8 7 | 8 7 | 6 5 | 7 6 | 7.2 |
| E5 | 8 7 | 8 8 | 8 7 | 8 8 | 8 8 | 8 8 | 7.8 |
| E6 | 8 7 | 8 7 | 8 7 | 8 7 | 8 7 | 8 7 | 7.5 |
| E7 | 9 8 | 8 7 | 8 7 | 7 6 | 7 6 | 6 5 | 7.0 |
| E8 | 8 8 | 7 6 | 8 7 | 7 6 | 8 7 | 7 6 | 7.1 |
| E9 | 9 8 | 9 8 | 7 6 | 7 6 | 6 5 | 6 6 | 6.9 |
| E10 | 9 8 | 8 7 | 9 7 | 8 7 | 9 8 | 8 7 | 7.9 |
| E11 | 9 8 | 9 8 | 8 7 | 8 7 | 7 6 | 7 7 | 7.6 |
| E12 | 9 8 | 9 8 | 8 9 | 9 8 | 8 7 | 8 7 | 8.1 |
| E13 | 9 8 | 9 8 | 8 7 | 8 7 | 7 6 | 8 7 | 7.7 |
| E14 | 9 8 | 9 8 | 9 8 | 9 8 | 8 7 | 8 7 | 8.2 |

TABLE 1

| | E1 | E2 | E3 | E4 | E5 | E6 |
|---|---|---|---|---|---|---|
| PP612MK10 | 78.75 | | | | | |
| PP513MNK10 | | 78.75 | | | | |
| BG A1 | | | 78.75 | | | |
| BG A2 | | | | 78.75 | | |
| BG B1 | | | | | 78.75 | |
| BG B2 | | | | | | 78.75 |
| Engage 8200 | 10 | 10 | 10 | 10 | 10 | 10 |
| Talc_1 | 10 | 10 | 10 | 10 | 10 | 10 |
| Other | 1.25 | 1.25 | 1.25 | 1.25 | 1.25 | 1.25 |
| MFI [g/10 min] | 25 | 40 | 36 | 31 | 7.4 | 6.6 |
| Izod 23° C. | 12 | 8.2 | 12 | 5.0 | 6.1 | 56 |
| N −20° C. [kJ/m2] | 4.5 | 3.8 | 3.8 | 3.6 | 3.8 | 8.1 |
| Flex_mod [N/mm2] | 1673 | 1615 | 1525 | 1618 | 1373 | 1273 |
| TS_avg | 6.0 | 7.3 | 6.3 | 7.2 | 7.8 | 7.5 |

TABLE 4

| | E15 | E16 | E17 | E18 | E19 | E20 |
|---|---|---|---|---|---|---|
| PP612MK10 | 63.75 | | | | | |
| PP513MNK10 | | 63.75 | | | | |
| BG A1 | | | 63.75 | | | |
| BG A2 | | | | 63.75 | | |
| BG B1 | | | | | 63.75 | |
| BG B2 | | | | | | 63.75 |
| Engage 8200 | 15 | 15 | 15 | 15 | 15 | 15 |
| Talc_1 | 20 | 20 | 20 | 20 | 20 | 20 |
| Other | 1.25 | 1.25 | 1.25 | 1.25 | 1.25 | 1.25 |
| MFI [g/10 min] | 22 | 31 | 32 | 24 | 4.4 | 5.5 |
| Izod 23° C. | 29.4 | 28.4 | 25.9 | 11.3 | 7.00 | 56.3 |
| N −20° C. [kJ/m2] | 4.78 | 4.61 | 4.31 | 3.94 | 4.09 | 14.8 |
| Flex_mod [N/mm2] | 1779 | 1787 | 1686 | 1841 | 1815 | 1569 |
| TS_avg | 5.2 | 5.7 | 5.7 | 5.8 | 6.6 | 7.3 |

TABLE 2

| | E7 | E8 | E9 | E10 | E11 | E12 | E13 | E14 |
|---|---|---|---|---|---|---|---|---|
| BG A1 | 63.75 | 63.75 | 48.75 | 48.75 | | | | |
| BG A2 | | | | | 63.75 | 63.75 | 48.75 | 48.75 |
| BG B1 | 15 | | 30 | | 15 | | 30 | |
| BG B2 | | 15 | | 30 | | 15 | | 30 |
| Engage 8200 | 10 | 10 | 10 | 10 | 10 | 10 | 10 | 10 |
| Talc_1 | 10 | 10 | 10 | 10 | 10 | 10 | 10 | 10 |
| Other | 1.25 | 1.25 | 1.25 | 1.25 | 1.25 | 1.25 | 1.25 | 1.25 |
| MFI [g/10 min] | 25 | 26 | 20 | 19 | 24 | 23 | 17 | 18 |
| Izod N 23° C. [kJ/m2] | 9.75 | 16.35 | 10.57 | 34.05 | 5.06 | 11.2 | 5.47 | 44.06 |
| −20° C. | 4.24 | 4.52 | 4.35 | 5.19 | 3.23 | 4.67 | 3.52 | 5.53 |
| Flex_mod [N/mm2] | 1479 | 1479 | 1462 | 1423 | 1570 | 1569 | 1519 | 1526 |
| TS_avg | 7.0 | 7.1 | 6.9 | 7.9 | 7.6 | 8.1 | 7.7 | 8.2 |

TABLE 5

|  | E21 | E22 | E23 | E24 | E25 | E26 | E27 | E28 | E29 |
|---|---|---|---|---|---|---|---|---|---|
| BG A1 | 48.75 | 48.75 | | | | | | | |
| BG A2 | | | 48.75 | 48.75 | 48.75 | 48.75 | 48.75 | 48.75 | 48.75 |
| BG B1 | 15 | | 15 | | | | | | |
| BG B2 | | 15 | | 15 | 15 | 15 | 15 | 15 | 15 |
| Engage 8200 | 15 | 15 | 15 | 15 | | | | 15 | 15 |
| Engage XLT 8677 | | | | | 15 | | | | |
| Tafmer DF740 | | | | | | 15 | | | |
| Tafmer DF605 | | | | | | | 15 | | |
| Talc_1 | 20 | 20 | 20 | 20 | 20 | 20 | 20 | | |
| Talc_2 | | | | | | | | 20 | |
| Talc_3 | | | | | | | | | 20 |
| Other | 1.25 | 1.25 | 1.25 | 1.25 | 1.25 | 1.25 | 1.25 | 1.25 | 1.25 |
| MFI [g/10 min] | 19 | 18 | 15 | 17 | 12 | 15 | 12 | 16 | 15 |
| Izod N 23° C. [kJ/m2] | 25.43 | 33.16 | 9.85 | 35.87 | 46.41 | 31.7 | 44.06 | 37.83 | 32.38 |
| −20° C. | 4.5 | 5.21 | 3.99 | 5.75 | 7.55 | 5.51 | 7.99 | 5.84 | 5.84 |
| Flex_mod [N/mm2] | 1791 | 1740 | 1918 | 1874 | 1890 | 1889 | 1930 | 1925 | 2119 |
| TS_avg | 5.9 | 6.2 | 6.5 | 6.7 | 6.3 | 6.7 | 6.6 | 6.5 | 6.4 |

TABLE 6

| | low speed | | medium speed | | high speed | | average |
|---|---|---|---|---|---|---|---|
| | smooth | texture | Smooth | Texture | Smooth | Texture | overall |
| | — | • | — | • | — | • | — | • | — | • | — | • | |
| E15 | 5 | 5 | 6 | 6 | 4 | 4 | 6 | 6 | 4 | 4 | 6 | 6 | 5.2 |
| E16 | 6 | 6 | 7 | 7 | 5 | 5 | 6 | 6 | 4 | 4 | 6 | 6 | 5.7 |
| E17 | 6 | 6 | 6 | 6 | 5 | 5 | 6 | 6 | 5 | 5 | 6 | 6 | 5.7 |
| E18 | 7 | 6 | 6 | 6 | 5 | 5 | 6 | 6 | 5 | 5 | 6 | 6 | 5.8 |
| E19 | 6 | 6 | 6 | 6 | 6 | 6 | 7 | 8 | 6 | 6 | 8 | 8 | 6.6 |
| E20 | 7 | 6 | 7 | 6 | 8 | 9 | 8 | 8 | 6 | 9 | 8 | 7.3 |
| E21 | 6 | 6 | 7 | 6 | 5 | 5 | 6 | 6 | 6 | 5 | 7 | 6 | 5.9 |
| E22 | 6 | 6 | 6 | 6 | 6 | 5 | 7 | 6 | 6 | 5 | 8 | 7 | 6.2 |
| E23 | 6 | 6 | 8 | 8 | 5 | 7 | 7 | 6 | 5 | 5 | 7 | 7 | 6.5 |
| E24 | 7 | 6 | 8 | 7 | 6 | 5 | 8 | 7 | 6 | 5 | 8 | 7 | 6.7 |
| E25 | 7 | 6 | 7 | 6 | 6 | 5 | 8 | 6 | 7 | 4 | 8 | 6 | 6.3 |
| E26 | 7 | 6 | 7 | 6 | 7 | 5 | 8 | 7 | 7 | 5 | 8 | 7 | 6.7 |
| E27 | 7 | 6 | 8 | 6 | 6 | 5 | 8 | 7 | 6 | 5 | 8 | 7 | 6.6 |
| E28 | 7 | 6 | 7 | 6 | 6 | 5 | 8 | 7 | 6 | 5 | 8 | 7 | 6.5 |
| E29 | 7 | 7 | 7 | 6 | 6 | 5 | 7 | 6 | 6 | 5 | 8 | 7 | 6.4 |

TABLE 7

|  | E30 | E31 | E32 | E33 | E34 | E35 | E36 | E37 | E38 |
|---|---|---|---|---|---|---|---|---|---|
| PP612MK10 | | | | | | 92.9 | 87.9 | 77.9 | 67.9 |
| BG A0 | 92.9 | 82.9 | 77.9 | 62.9 | 52.9 | | | | |
| BG B0 | 0 | 10 | 10 | 15 | 15 | 0 | 0 | 0 | 0 |
| Engage 8200 | 0 | 0 | 5 | 10 | 20 | 0 | 5 | 10 | 10 |
| Talc_4 | 5 | 5 | 5 | 10 | 20 | 5 | 5 | 10 | 20 |
| Other | 2.1 | 2.1 | 2.1 | 2.1 | 2.1 | 2.1 | 2.1 | 2.1 | 2.1 |
| MFI [g/10 min] | 36.1 | 32.7 | 30.8 | 25.5 | 20.7 | 28.9 | 25.2 | 22.1 | 21.1 |
| Flex_mod [MPa][1] | 1578 | 1521 | 1430 | 1474 | 1747 | 1692 | 1568 | 1580 | 1869 |
| Izod N [kJ/m2] @ 23° C. | 5.9 | 6.1 | 12.9 | 51.1 | 60 | 8.4 | 23.6 | 40.2 | 36.6 |
| Scratch dL [%] | 0.3 | 0.3 | 0.2 | 0.4 | 1.2 | 2.2 | 1.6 | 1.7 | 2.8 |
| TS_avg | 7.8 | 8.0 | 8.0 | 8.0 | 6.2 | 7.5 | 6.8 | 5.8 | 4.7 |

[1]According to ASTM D790 at 23° C., parallel

The invention claimed is:

1. A polyolefin composition comprising a first heterophasic propylene copolymer and a second heterophasic propylene copolymer, wherein the first heterophasic propylene copolymer comprises:

from 70-90 wt % of a first polypropylene having a melt flow index of from 55-85 g/10 min as measured according to ISO 1133 (2.16 kg and 230° C.),
from 10-30 wt % of a first ethylene α-olefin copolymer having a melt flow index of from 2.5-5.0 g/10 min in accordance with ISO 1133 (2.16 kg and 230° C.),
the respective amounts of first polypropylene and first ethylene α-olefin copolymer being based on the weight of the first heterophasic propylene copolymer and wherein the second heterophasic propylene copolymer comprises:
- from 60-85 wt % of a second polypropylene having a melt flow index of from 50-100 g/10 min as measured according to ISO 1133 (2.16 kg and 230° C.),
from 15-40 wt % of a second ethylene α-olefin copolymer having a melt flow index of from 0.050-0.30 g/10 min in accordance with ISO 1133 (2.16 kg and 230° C.),
the respective amounts of second polypropylene and second ethylene α-olefin copolymer being based on the weight of the second heterophasic propylene copolymer wherein a weight ratio of said first and second heterophasic propylene copolymer is from 1 to 10.

2. The polyolefin composition of claim 1 wherein the first and/or second heterophasic propylene copolymer is/are reactor grade propylene copolymer(s).

3. The polyolefin composition according to claim 1, wherein the first ethylene α-olefin copolymer is an ethylene propylene copolymer having an ethylene content of from 40-65 wt % based on the weight of the ethylene propylene copolymer.

4. The polyolefin composition according to claim 1, wherein the second ethylene α-olefin copolymer is an ethylene propylene copolymer having an ethylene content of from 30-65 wt % based on the weight of the ethylene propylene copolymer.

5. The polyolefin composition according to claim 1, wherein the first and/or second polypropylene is a propylene homopolymer or a propylene α-olefin copolymer containing at least 97 wt % propylene, based on the weight of the first and/or second polypropylene.

6. The polyolefin composition according to claim 1, wherein one or both of the first and second heterophasic propylene copolymer are non-visbroken copolymers.

7. A moulding compound comprising the polyolefin composition according to claim 1 and from 1 to 30 wt % of an inorganic filler based on the weight of the compound.

8. The moulding compound according to claim 7 further comprising from 1-25 wt %, based on the weight of the compound, of an ethylene α-olefin copolymer elastomer.

9. The moulding compound according to claim 7 having an average tiger stripe rating, as defined in the specification, of at least 6.0.

10. A moulded article comprising the polyolefin composition according to claim 1.

11. The compound according to claim 8, wherein the ethylene α-olefin copolymer elastomer is one or more of an ethylene butene copolymer elastomer, an ethylene hexene copolymer elastomer and an ethylene octene copolymer elastomer.

12. The compound according to claim 8, wherein the ethylene α-olefin copolymer elastomer is one or more of an metallocene ethylene octene copolymer elastomer and a metallocene ethylene butene copolymer elastomer.

13. A method of making an article, comprising:
injection molding the compound of claim 7 to form the article.

14. An automotive part, comprising:
a compound comprising a first heterophasic propylene copolymer, a second heterophasic propylene copolymer, an inorganic filler, and an ethylene α-olefin copolymer elastomer;
wherein the first heterophasic propylene copolymer comprises
from 70-90 wt % of a first polypropylene having a melt flow index of from 55-85 g/10 min as measured according to ISO 1133 (2.16 kg and 230° C.), wherein the first polypropylene is a propylene homopolymer or a propylene α-olefin copolymer containing at least 97 wt % propylene, based on the weight of the first second polypropylene, and
from 10-30 wt % of a first ethylene α-olefin copolymer having a melt flow index of from 2.5-5.0 g/10 min in accordance with ISO 1133 (2.16 kg and 230° C.), wherein the first ethylene α-olefin copolymer is an ethylene propylene copolymer having an ethylene content of from 40-60 wt %, based on the weight of the ethylene propylene copolymer;
the respective amounts of first polypropylene and first ethylene α-olefin copolymer being based on the weight of the first heterophasic propylene copolymer;
wherein the second heterophasic propylene copolymer comprises
from 60-85 wt % of a second polypropylene having a melt flow index of from 50-100 g/10 min as measured according to ISO 1133 (2.16 kg and 230° C.), wherein the second polypropylene is a propylene homopolymer or a propylene α-olefin copolymer containing at least 97 wt % propylene, based on the weight of the second polypropylene, and
from 15-40 wt % of a second ethylene α-olefin copolymer having a melt flow index of from 0.050-0.30 g/10 min in accordance with ISO 1133 (2.16 kg and 230° C.), wherein the second ethylene α-olefin copolymer is an ethylene propylene copolymer having an ethylene content of from 30-65 wt % based on the weight of the ethylene propylene copolymer,
the respective amounts of second polypropylene and the second ethylene α-olefin copolymer being based on the weight of the second heterophasic propylene copolymer;
wherein the automotive part has an average tiger stripe rating of at least 6.5.

15. The automotive part according to claim 14, wherein the first ethylene α-olefin copolymer is an ethylene propylene copolymer having an ethylene content of from 50-58 wt %, based on the weight of the ethylene propylene copolymer, and wherein the second ethylene α-olefin copolymer is an ethylene propylene copolymer having an ethylene content of from 30-50 wt %, based on the weight of the ethylene propylene copolymer.

16. The polyolefin composition according to claim 1, wherein the first ethylene α-olefin copolymer is an ethylene propylene copolymer having an ethylene content of from 50-58 wt %, based on the weight of the ethylene propylene copolymer, and wherein the second ethylene α-olefin copolymer is an ethylene propylene copolymer having an ethylene content of from 30-50 wt %, based on the weight of the ethylene propylene copolymer.

17. The moulding compound according to claim 7, wherein the first ethylene α-olefin copolymer is an ethylene propylene copolymer having an ethylene content of from 50-58 wt %, based on the weight of the ethylene propylene copolymer, and wherein the second ethylene α-olefin copolymer is an ethylene propylene copolymer having an ethylene content of from 30-50 wt %, based on the weight of the ethylene propylene copolymer.

18. The moulding compound according to claim 1, wherein the second ethylene α-olefin copolymer is an ethylene propylene copolymer having an ethylene content of from 35-40 wt %, based on the weight of the ethylene propylene copolymer.

* * * * *